US007431145B2

(12) United States Patent
Ganter

(10) Patent No.: US 7,431,145 B2
(45) Date of Patent: Oct. 7, 2008

(54) DEVICE FOR TRANSFERRING BOOK BLOCKS OR BOOKS FOR SYNCHRONIZED PROCESSING

(75) Inventor: Christian Ganter, Bieberehren (DE)

(73) Assignee: Müller Martini Holding AG, Hergiswil (CH)

( * ) Notice: Subject to any disclaimer, the term of this patent is extended or adjusted under 35 U.S.C. 154(b) by 0 days.

(21) Appl. No.: 11/111,094

(22) Filed: Apr. 21, 2005

(65) Prior Publication Data

US 2005/0241917 A1 Nov. 3, 2005

(30) Foreign Application Priority Data

Apr. 26, 2004 (EP) .................................. 04405259

(51) Int. Cl.
*B65G 15/14* (2006.01)

(52) U.S. Cl. ...................................... 198/626.1; 412/11

(58) Field of Classification Search .............. 198/626.1, 198/626.5, 626.6; 412/11; 227/44, 40
See application file for complete search history.

(56) References Cited

U.S. PATENT DOCUMENTS 2,777,562 A 1/1957 McCahon et al.
3,399,755 A 9/1968 Bryson et al.
4,735,302 A * 4/1988 Marchetti ................ 198/463.4
5,137,099 A * 8/1992 Tolson ........................... 177/5
5,287,954 A * 2/1994 Draghetti ................ 198/460.1

FOREIGN PATENT DOCUMENTS

| | | |
|---|---|---|
| CH | 625 183 | 9/1981 |
| DE | 1 208 289 | 1/1966 |
| DE | 2 231 955 | 2/1973 |
| DE | 34 45 928 | 6/1986 |
| DE | 3840816 A1 | 6/1990 |
| DE | 3840816 C2 | 5/1999 |
| EP | 1 232 879 | 8/2002 |

* cited by examiner

*Primary Examiner*—Mark A Deuble
(74) *Attorney, Agent, or Firm*—Friedrich Kueffner

(57) ABSTRACT

A device for transferring book blocks or books on a conveyance path for synchronized processing in a downstream machine includes a feeding device for the successive book blocks and a synchronizing device downstream of the feeding device. The synchronizing device has a conveyor belt that is connected with the feeding device in a way that allows conveyance. The book blocks are fed on the conveyor belt with lateral guidance to a drive device, which is drive-connected with the conveyor belt and acts to convey the book blocks.

11 Claims, 2 Drawing Sheets

DEVICE FOR TRANSFERRING BOOK BLOCKS OR BOOKS FOR SYNCHRONIZED PROCESSING

BACKGROUND OF THE INVENTION

1. Field of the Invention

The present invention relates to a device for transferring book blocks or books on a conveyance path for synchronized processing in a downstream machine, with a feeding device for the successive book blocks and with a synchronizing device downstream of the feeding device.

2. Description of the Related Art

The book blocks can be both unbound and bound printed products, for example, perfect-bound or thread-stitched.

Downstream machines are understood to be machines for further processing, such as back gluing machines for gluing the spines of book blocks, adhesive binders, cutting machines, or similar synchronously processing machines for producing printed products, or clock-pulse-controlled conveyor equipment.

The book blocks or books follow one another in succession, for example, standing on their spines, or lying on the flat side, preferably with the head or foot edge first.

EP 1 232 879 describes an introduction device for conveying unbound book blocks consisting of individual sheets or layers from an upstream machine, for example, a gathering machine, to a downstream machine. A perfect binder is mentioned as an example of a downstream machine to which the introduction device is assigned. The introduction device consists of an endless revolving conveyor chain with attached pusher bars, a support that supports the spines of the book blocks as they are conveyed in an upright position, and lateral guides. The conveyor chain can be reversibly tilted into a downwardly angled position in the entry zone, so that the pusher bars continue to pass below the support.

DE 38 40 816 C2 describes an introduction device for conveying book blocks into a downstream machine. The introduction device consists of an endless revolving conveyor chain with attached pusher bars, on which the book blocks line up with their rear ends during conveyance and are guided over a support. In the entry zone of the introduction device, a conveying device is provided, which receives the book blocks from a transfer system and conveys them further but at a lower speed than the pusher bars of the introduction device.

Furthermore, Solema sells an introduction device for the precisely synchronized conveyance of book blocks into a downstream machine. The introduction device consists of an endless revolving conveyor belt and a block stop, which engages transversely to the direction of conveyance and prevents the upright book block at the end of the conveyor belt from passing. When requested by the downstream machine, the block stop releases this book, and at the same time, a clamping device, which can be moved in the direction of conveyance, holds back the next book block, which has moved up to the first book block, until a sufficiently large gap has formed between the first and second book blocks to allow the block stop to drop back in and thus hold back the second book block.

SUMMARY OF THE INVENTION

It is the object of the present invention to develop a device of the aforementioned type which guarantees reliable transfer of the book blocks or books into the downstream machine and requires precise positioning for this in the synchronizing device.

In accordance with the invention, the object is met by providing the synchronizing device with a conveyor belt that is connected with the feeding device in a way that allows conveyance, on which conveyor belt the book blocks are fed with lateral guidance to a drive device, which is drive-connected with the conveyor belt and acts to convey the book blocks.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
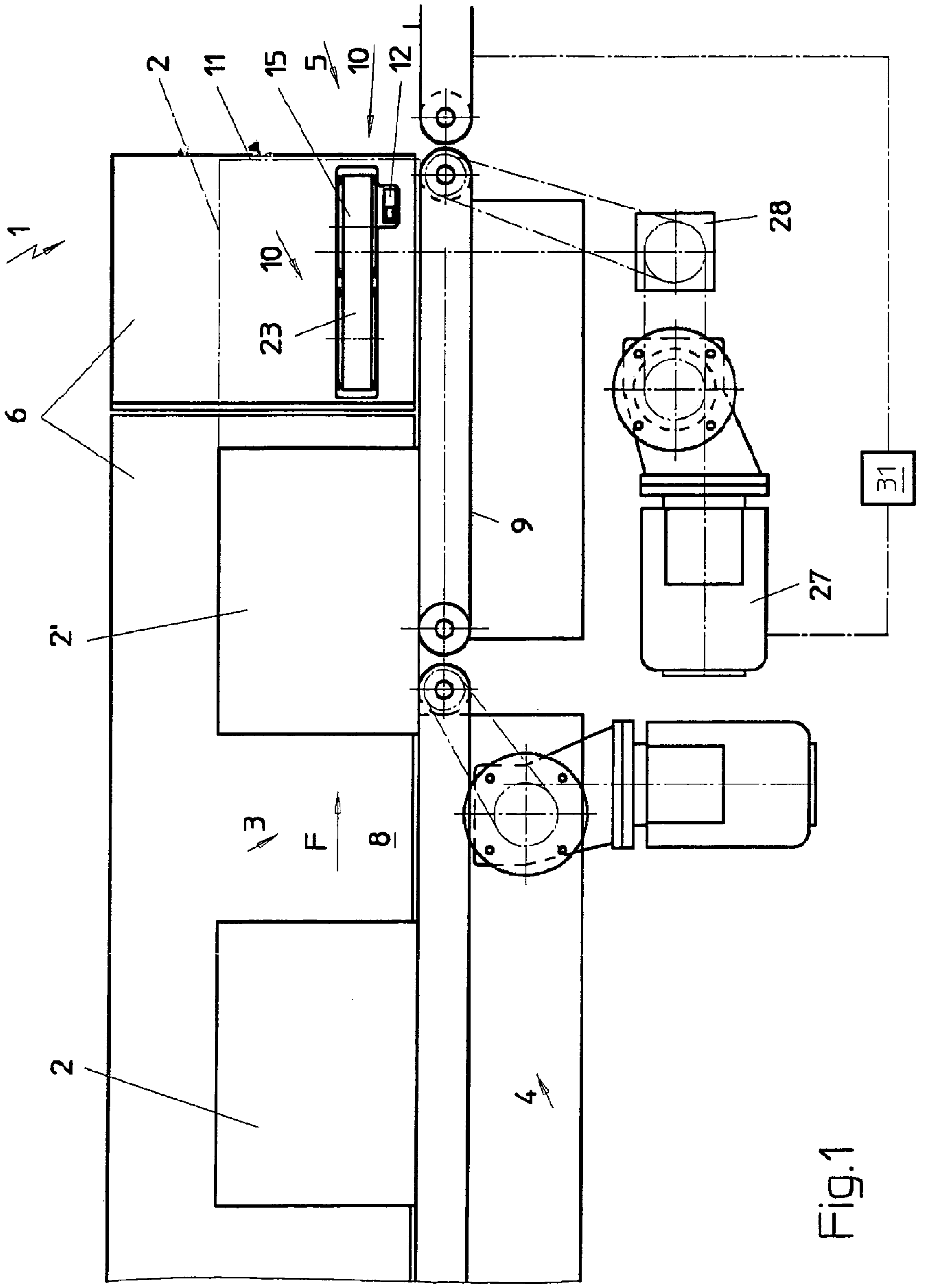
FIG. 1 is a longitudinal sectional view through a schematically represented embodiment of the device of the invention taken along sectional line I-I in FIG. 2.
Figure 2:
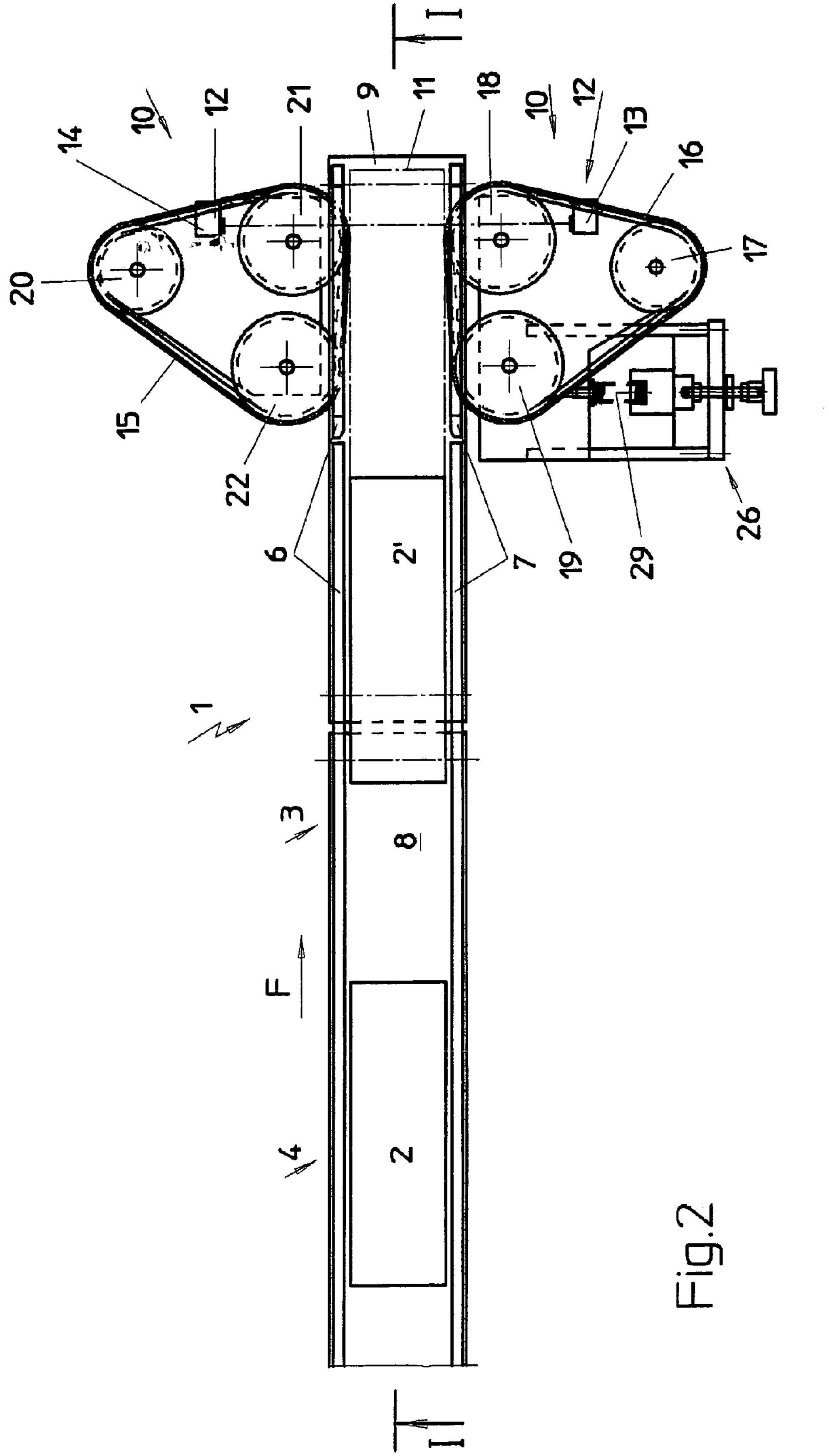
FIG. 2 is a top view of the device shown in FIG. 1.

FIGS. 1 and 2 show a device 1 for transferring book blocks 2 or books on a conveyance path 3 for synchronized processing or further processing of the book blocks 2 in a downstream machine. The device 1 is preceded by a feeding device 4, which is designed as a conveyor belt but could also be a different type of suitable conveyance device, which transfers the book blocks, which are conveyed one after the other, with or without gaps between them, to a synchronizing device 5. The book blocks are preferably transferred standing upright on their spines or lying on one of their flat sides. Guide walls 6, 7 are installed above the feeding device 4 or along the conveyance path 3 to help guide the printed products 2 on both sides. At least one guide wall 6, 7 can be laterally adjusted to change the width of a guide channel 8 formed by the guide walls to allow for format variability of the book blocks 2. The synchronizing device 5 consists of a conveyor belt 9, which is connected with the feeding device 4 in a way that allows conveyance, and a drive device 10 that acts to convey the book blocks 2. The book blocks 2 continue to be laterally guided on the conveyor belt 9.

The drive device 10 is designed for the controlled braking or stopping and subsequent controlled acceleration of the book blocks 2. To this end, the drive device 10 is positioned before the delivery end of the conveyor belt 9. To achieve controlled braking or stopping of a book block 2 and especially to stop its front edge 11 at a certain point along the conveyance path 3, preferably behind or, in the direction of conveyance F, after the drive device 10, a sensor 12, which comprises, for example, a transmitter 13 and receiver 14, is installed in a conveyance zone of the drive device 10. The overhanging region of a book block 2 at the drive device 10 is preferably selected to be short, so that the fixed length available for the acceleration of the book block 2 in the drive device 10 can be optimally utilized, especially when the book blocks 2 have a small format size. As soon as a book block 2 is present in the drive device 10, after it has reached the stop position in the synchronizing device 5 via the conveyor belt 9 and the drive device 10, which is driven at a faster conveying speed than the conveyor belt 9, and a triggering signal of the downstream machine has been received, the book block 2 is removed under high acceleration from the drive device 10 or the synchronizing device 5 and fed to the downstream machine, which synchronously further processes the book blocks 2, or to a conveyance device (chain) assigned to the downstream machine. In this regard, the acceleration of the drive device 10 produces a gap between the accelerated book block 2 and a following book block 2', which is located on the conveyor belt 9 and which is driven at a lower speed (for example, about 15% lower) than the drive device 10. The gap prevents the following book block 2' from also being picked up by the drive device 10 during the acceleration of the preceding book block 2. The formation of a gap between the book block 2 that is to be removed and the following book block 2' plays a special role particularly in the synchronizing operation with small format sizes and small conveyance length, since the sensor 12 can detect the front edge of book block 2' and brake book block 2'. When book block 2' has come to a stop, book block 2 must already have left the drive device 10. The feeding device 4 and the conveyor belt 9 have about the same conveying speed, which can be varied. The drive device 10 can consist of drive rollers or revolving drive belts 15 that act on the book blocks 2 to convey them. The rollers or belts could be arranged differently from the manner shown in FIGS. 1 and 2 in such a way that a roller or a revolving belt is connected to the conveyor belt 9 in a way that allows conveyance and serves the purpose of acceleration to achieve synchronization, such that a guide roller and/or a guide belt is provided on each side of a book block 2, and both guide rollers and/or guide belts have the same conveying speed as the roller or belt connected to the conveyor belt 9.

FIGS. 1 and 2 show an embodiment in which the drive device 10, which acts on both sides on a book block 2 that is being conveyed upright on its spine, consists of a revolving drive belt 15 on each side of the conveyance, path 3. These revolving drive belts 15 are driven about vertical axes of drivable rollers 17, 18, 19; 20, 21, 22. The roller arrangements are advantageously selected in such a way that the drive belts 15, 16 form conveying strands 23, 24, which bound an entry gap or conveyance gap 25 that (gradually) narrows in the direction of conveyance F, so that the book blocks 2 can be gently seized by the conveying strands 23, 24. Of the roller arrangements 17 to 19 and 20 to 22, at least one roller 17, 18, 19 is elastically supported by a spring. A supporting device 26 of this type is illustrated in FIG. 2. The roller arrangements are driven by rollers 17, 20, as is illustrated schematically in FIG. 1. For this purpose, an electric motor 27 is provided with gearing, which drives the conveyor belt 9, on the one hand, and the rollers 17, 20 of the drive device 10, on the other hand, via distribution gearing 28. This results in a permanent drive connection between the conveyor belt 9 and the drive device 10. Naturally, the conveyor belt 9 and the drive device 10 can each have its own angle of rotation controlled drive motor, with which the speed ratio of the conveyor belt 9 and the drive device 10 can be adjusted or varied. As a result of the fact that the drive device 10 or the roller arrangements 17, 18, 19; 20, 21, 22 exert pressure on the lateral surfaces of the book blocks 2, 2', which are being conveyed upright on their spines, a rolling friction connection develops between the book block 2 and the conveying strands 25 of the drive belts 15, 16, which (rolling friction connection) applies to a friction section of the drive belts 15, 16. A similar frictional effect also occurs, for example, where, instead of roller arrangements, a single roller that is driven about a vertical axis on each side is used to convey the book blocks 2.

In the production process, book blocks 2 are fed by the feeding device 4 to the conveyor belt 9, which is part of the synchronizing device 5. The book blocks 2 are preferably standing upright on their spines and aligned in the direction of conveyance F. The book blocks 2 can be delivered to the conveyor belt 9 spaced apart or without gaps. On the conveyor belt 9, the book blocks 2' reach the drive device 10, which consists of two opposing roller arrangements 17 to 19 and 20 to 22. The belts 15, 16 revolving on the rollers 17 to 22 run at a speed that is about 15% higher than the speed of the conveyor belt 9. As a result, the incoming book block 2, 2' is pulled forward, its front edge is detected by the sensor 12, and it is braked to a stop. A synchronously operating downstream machine 30 triggers. (via a control system 31) the acceleration of the book block 2, which is frictionally engaged in the synchronizing device 5 or drive device 10. This acceleration is so great that the book block 2 that is being moved out has left the synchronizing device 5 before the next book block 2', which is located on the conveyor belt 9, has reached the drive device 10. The drive device 10 moves the following book block 2 into the stop position and then accelerates it after an acceleration signal has been received from the downstream machine 30.

I claim:

1. A device for transferring book blocks or books on a conveyance path for synchronized processing in a downstream machine, comprising a feeding device for successive book blocks and a synchronizing device downstream of the feeding device, wherein the synchronizing device has a conveyor belt connected with the feeding device in a way that allows conveyance of the book blocks on the conveyor belt with lateral guidance to a drive device, wherein the drive device is drive-connected with the conveyor belt for conveying the book blocks, wherein the drive device is arranged exclusively in front of the delivery end of the conveyor belt, and wherein a sensor that acts transversely to the direction of conveyance is assigned to detect the leading edge of the book block at a predetermined point in a conveyance zone of the drive device and cooperates with the drive device to achieve controlled braking or stopping of a book block directly before the downstream machine.

2. Device in accordance with claim 1, wherein the drive device is configured for braking or stopping and for accelerating the book blocks.

3. The device in accordance with claim 1, wherein the downstream machine comprises means for triggering a signal for accelerating a book block that is in a braked or stopped position in the drive device.

4. The device in accordance with claim 1, wherein the conveying speed of the feeding device is at least approximately the same as the speed of the conveyor belt.

5. The device in accordance with claim 1, wherein the drive device has at least one drive roller or revolving drive belt inserted in the conveyance zone.

6. The device in accordance with claim 5, wherein the drive device has two drive rollers that oppose each other along the conveyance zone, form a conveyance gap, and rotate about vertical axes.

7. The device in accordance with claim 5, wherein the drive device has two belts that oppose each other along the conveyance zone, form a conveyance gap, and revolve about at least two rollers each.

8. The device in accordance with claim 7, wherein the conveying strands of the drive belts that face a book block form a conveyance gap that narrows in the direction of conveyance.

9. The device in accordance with claim 1, wherein the conveyor belt and the drive device are connected by gearing with an electric motor.

10. The device in accordance with claim 1, wherein the synchronizing device is synchronized with the downstream machine by a control system.

11. A device for transferring book blocks or books on a conveyance path for synchronized processing in a downstream machine, comprising a feeding device for successive book blocks and a synchronizing device downstream of the feeding device, wherein the synchronizing device has a conveyor belt connected with the feeding device in a way that allows conveyance of the book blocks on the conveyor belt with lateral guidance to a drive device, wherein the drive device is drive-connected with the conveyor belt for conveying the book blocks, wherein the drive device is arranged in front of the delivery end of the conveyor belt, and wherein, to achieve controlled braking or stopping of a book block, a sensor that acts transversely to the direction of conveyance is assigned to the leading edge of the book block at a predetermined point in a conveyance zone of the drive device, wherein the drive device acting on a book block is configured to convey the book block with a first speed and the conveyor belt feeding the book block is configured to feed the book block with a second speed, wherein the first speed is greater than the second speed.

* * * * *